(12) United States Patent
Dong et al.

(10) Patent No.: US 11,979,294 B2
(45) Date of Patent: May 7, 2024

(54) NETWORK MANAGEMENT METHOD AND NETWORK MANAGEMENT SYSTEM

(71) Applicant: HUAWEI TECHNOLOGIES CO., LTD., Shenzhen (CN)

(72) Inventors: Feng Dong, Nanjing (CN); Tao Han, Nanjing (CN); Tongjiang Yang, Nanjing (CN); Xinyu Yan, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/697,068

(22) Filed: Mar. 17, 2022

(65) Prior Publication Data

US 2022/0210027 A1    Jun. 30, 2022

Related U.S. Application Data

(63) Continuation of application No. PCT/CN2020/116017, filed on Sep. 17, 2020.

(30) Foreign Application Priority Data

Sep. 18, 2019 (CN) .......................... 201910882620.5

(51) Int. Cl.
*H04L 41/14* (2022.01)
*G06N 5/022* (2023.01)
(Continued)

(52) U.S. Cl.
CPC .......... *H04L 41/145* (2013.01); *G06N 5/022* (2013.01); *H04L 12/4641* (2013.01); *H04L 41/12* (2013.01); *H04L 41/16* (2013.01)

(58) Field of Classification Search
CPC ... H04L 41/145; H04L 12/4641; H04L 41/12; H04L 41/16; H04L 41/0886;
(Continued)

(56) References Cited

U.S. PATENT DOCUMENTS

| 6,012,152 | A | 1/2000 | Douik et al. |
| 8,094,647 | B2 * | 1/2012 | Elliott .................. H04L 65/401 370/231 |

(Continued)

FOREIGN PATENT DOCUMENTS

| CN | 106533720 A | 3/2017 |
| CN | 109560968 A | 4/2019 |

(Continued)

*Primary Examiner* — Sm A Rahman
(74) *Attorney, Agent, or Firm* — HUAWEI TECHNOLOGIES CO., LTD.

(57) ABSTRACT

A network management method. The method includes: obtaining a network type of a target network; obtaining a logical network model of the target network based on the network type and a logical network recommendation model; determining a physical network model of the target network based on the logical network model and a physical network recommendation model; and performing network configuration based on the physical network model of the target network. An advantage of the embodiments lies in that, when a user inputs the network type of the target network instead of a large quantity of detailed network configurations, a network management system can automatically establish the required target network for the user, thereby greatly improving efficiency of establishing the target network.

18 Claims, 10 Drawing Sheets

(51) Int. Cl.
*H04L 12/46* (2006.01)
*H04L 41/12* (2022.01)
*H04L 41/16* (2022.01)

(58) Field of Classification Search
CPC . H04L 41/0895; H04L 41/5054; H04L 43/20; H04L 43/50; H04L 41/0806; G06N 5/022; G06N 5/02; G06N 20/00; G06F 16/9024; G06F 16/9535
See application file for complete search history.

(56) References Cited

U.S. PATENT DOCUMENTS

| | | | |
|---|---|---|---|
| 11,531,780 B2 * | 12/2022 | Kundu | G06N 3/04 |
| 2007/0281707 A1 | 12/2007 | Thomson et al. | |
| 2019/0034484 A1 | 1/2019 | Das et al. | |
| 2019/0146810 A1 | 5/2019 | Ganesh | |
| 2019/0149396 A1 * | 5/2019 | Zafer | H04L 41/0654 |
| | | | 709/224 |
| 2020/0050605 A1 * | 2/2020 | Tung | G06F 16/2425 |
| 2020/0084112 A1 * | 3/2020 | Kandaswamy | H04L 41/0823 |

FOREIGN PATENT DOCUMENTS

| | | | | |
|---|---|---|---|---|
| CN | 110198237 A | | 9/2019 | |
| KR | 20180080097 A | * | 7/2018 | G06F 16/20 |

\* cited by examiner

NETWORK MANAGEMENT METHOD AND NETWORK MANAGEMENT SYSTEM

CROSS-REFERENCE TO RELATED APPLICATIONS

This application is a continuation of International Application No. PCT/CN2020/116017, filed on Sep. 17, 2020, which claims priority to Chinese Patent Application No. 201910882620.5 filed on Sep. 18, 2019. The disclosures of the aforementioned applications are hereby incorporated by reference in their entireties.

FIELD

The embodiments relate to the communications field, and in particular, to a network management method and a network management system.

BACKGROUND

Currently, when a network needs to be deployed for a user, a network deployment party needs to perform a large amount of manual service analysis based on a requirement of the user. First, service requirements, such as network scale in/out and addition of service configurations are analyzed manually. Then, network requirements including network dimensioning, resource occupation, security, SLA, load balancing, extranet access control, and the like are analyzed still manually. Subsequently, a logical network model and a deployment location further need to be determined manually. Because this manner depends on experience and skills of an operator, randomness is high and an error probability is high. Operations depend on manual work. This is time-consuming, labor-consuming, and inefficient. It is difficult to meet scenarios in which applications are diversified and requirements change frequently.

SUMMARY

An objective of the embodiments is to provide a method for automatically deploying a network based on an intent of a user and a network management system that can implement this method.

Solutions of the embodiments include the following content.

A first aspect provides a network management method. The method includes: obtaining a network type of a target network; obtaining a logical network model of the target network based on the network type and a logical network recommendation model; determining a physical network model of the target network based on the logical network model and a physical network recommendation model; and performing network configuration based on the physical network model of the target network.

In the first aspect, the logical network recommendation model may be a recommendation model based on a knowledge graph.

In the first aspect, the knowledge graph may include m entities, the m entities are located at n layers, entities located at a lowest layer are indivisible entities and are provided with a plurality of attribute values, m and n are natural numbers, and m is greater than n.

In the first aspect, determining the physical network model of the target network based on the logical network model and the physical network recommendation model may include: determining a plurality of physical network models based on the logical network model and the physical network recommendation model, where the physical network recommendation model includes a plurality of preliminary physical network recommendation models, and each physical network model corresponds to one preference; and selecting one from the plurality of physical network models based on a selection of a user as the physical network model of the target network.

In the first aspect, performing the network configuration based on the physical network model of the target network may include: performing a simulation test on the physical network model of the target network; and performing the network configuration based on the physical network model after determining that the simulation test of the physical network model succeeds.

In the first aspect, the method may further include: detecting running of the target network obtained based on the network configuration; and adjusting the physical network recommendation model based on a detection result.

In the first aspect, the logical network model may include a plurality of logical nodes and a performance requirement for the plurality of logical nodes, and the physical network model includes a plurality of physical nodes and configuration parameters of the plurality of physical nodes.

In the first aspect, the physical network recommendation model may be obtained based on a supervised or an unsupervised machine learning algorithm. In the first aspect, the network type of the target network may include a web service, an application (APP) service, and/or a database (DB) service.

In the first aspect, the logical network model may include a virtual private cloud VPC.

A second aspect provides a network management system. The network management system includes: an obtaining module, configured to obtain a network type of a target network; a logical model module, configured to obtain a logical network model of the target network based on the network type and a logical network recommendation model; a physical model module, configured to determine a physical network model of the target network based on the logical network model and a physical network recommendation model; and a configuration module, configured to perform network configuration based on the physical network model of the target network.

In the second aspect, the logical network recommendation model may be a recommendation model based on a knowledge graph.

In the second aspect, the knowledge graph may include m entities, the m entities are located at n layers, entities located at a lowest layer are indivisible entities and are provided with a plurality of attribute values, m and n are natural numbers, and m is greater than n.

In the second aspect, the physical model module may be configured to: determine a plurality of physical network models based on the logical network model and the physical network recommendation model, where the physical network recommendation model includes a plurality of preliminary physical network recommendation models, and each physical network model corresponds to one preference; and select one from the plurality of physical network models based on a selection of a user as the physical network model of the target network.

In the second aspect, the configuration module may be configured to: perform a simulation test on the physical network model of the target network; and perform the network configuration based on the physical network model after determining that the simulation test of the physical network model succeeds.

In the second aspect, the system may further include: a detection module, configured to detect running of the target network obtained based on the network configuration; and an adjustment module, configured to adjust the physical network recommendation model based on a detection result.

In the second aspect, the logical network model may include a plurality of logical nodes and a performance requirement for the plurality of logical nodes, and the physical network model includes a plurality of physical nodes and configuration parameters of the plurality of physical nodes.

In the second aspect, the physical network recommendation model may be obtained based on a supervised or unsupervised machine learning algorithm.

In the second aspect, the network type of the target network may include a web service, an application (APP) service, and/or a database (DB) service.

In the second aspect, the logical network model may include a virtual private cloud VPC.

An advantage of the embodiments lies in that, when the user inputs the network type of the target network instead of a large quantity of detailed network configurations, the network management system can automatically establish the required target network for the user, thereby greatly improving efficiency of establishing the target network. The network type of the target network input by the user may be understood as an intent of the user instead of a configuration solution of the user. Therefore, the method may be understood as implementing automatic establishment of the network required by the user based on the intent of the user.

DETAILED DESCRIPTION OF THE EMBODIMENTS

The following describes the embodiments in detail with reference to the accompanying drawings. However, it should be noted that the following embodiments are merely examples for helping understand the solutions, and do not indicate by default that these embodiments cannot be implemented by using another solution, and do not indicate by default that the features are mandatory.

Figure 1:
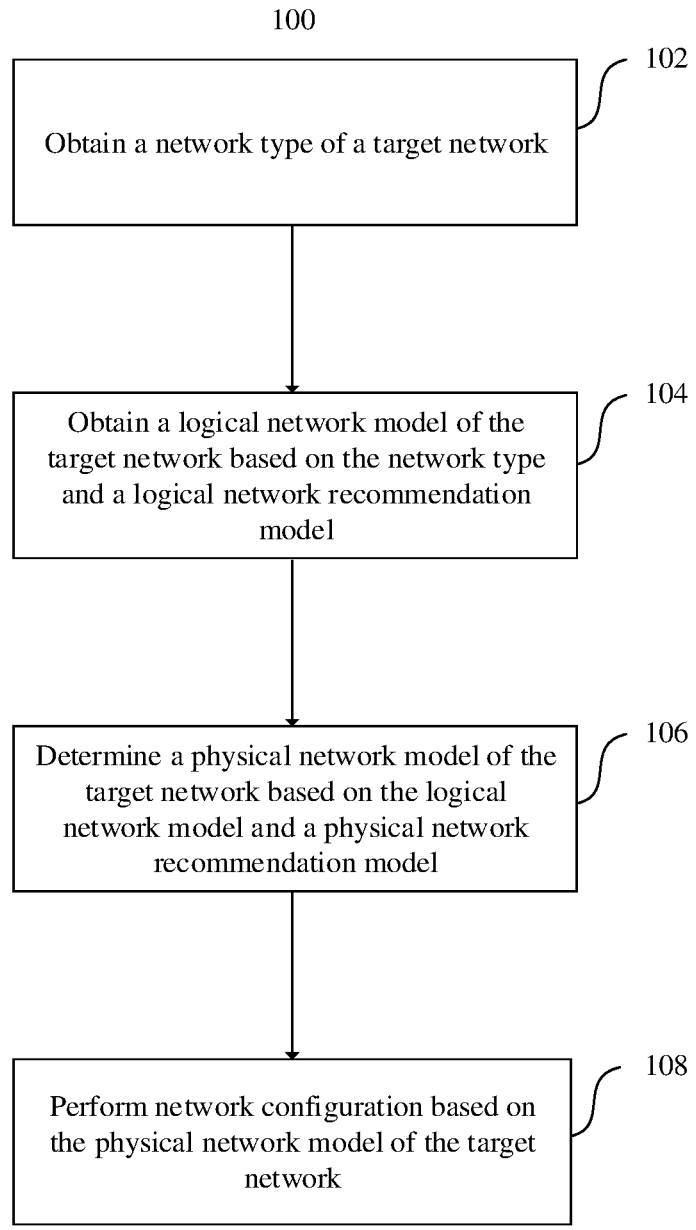
FIG. 1 is a flowchart of a network configuration method 100 for generating a target network according to an embodiment.

FIG. 1 is a flowchart of a network configuration method 100 for generating a target network according to an embodiment. As shown in FIG. 1, the method 100 includes the following content.

102: Obtain a network type of a target network. For example, the network type of the target network includes a web service, an application (APP) service, and/or a database (DB) service.

104: Obtain a logical network model of the target network based on the network type and a logical network recommendation model. The logical network recommendation model may be a recommendation model based on a knowledge graph or may be a recommendation model obtained based on other technologies. The knowledge graph includes m entities, the m entities are located at n layers, entities located at a lowest layer are indivisible entities and are provided with a plurality of attribute values, m and n are natural numbers, and m is greater than n. The logical network model includes a plurality of logical nodes and a performance requirement for the plurality of logical nodes. The logical network model may include a virtual private cloud (VPC).

106: Determine a physical network model of the target network based on the logical network model and a physical network recommendation model.

The physical network recommendation model may include a plurality of preliminary physical network recommendation models, and each preliminary physical network recommendation model corresponds to one preference. For example, the preference may be performance priority, cost priority, or security priority. In this case, a plurality of physical network models corresponding to preferences may be obtained based on the logical network model and the plurality of preliminary physical network recommendation models. Then, one physical network model is determined from the plurality of physical network models corresponding to preferences as the physical network model of the target network. The physical network recommendation model may include only one physical network recommendation model. In this case, the physical network model of the target network may be directly determined based on the logical network model and the physical network recommendation model and does not need to be selected from the plurality of physical network models corresponding to preferences. The physical network recommendation model is obtained based on a supervised or unsupervised machine learning algorithm. For example, the supervised algorithm may be a logistic regression algorithm, a random forest algorithm, or the like, and the unsupervised algorithm may be a K-MEANS algorithm, an EM algorithm, or the like.

108: Perform network configuration based on the physical network model of the target network.

A process of performing network configuration may include a simulation test process before the network configuration is performed. The simulation test process includes performing a simulation test on the physical network model of the target network. The network configuration is performed based on the physical network model after it is determined that the simulation test of the physical network model succeeds. The network configuration is not performed based on the physical network model if the simulation test of the physical network model does not succeed. The physical network recommendation model regenerates a new physical network model. The network configuration is performed based on the new physical network model if the simulation test of the new physical network model succeeds.

After the network configuration is performed, in the method 100, running of the target network obtained based on the network configuration may further be detected; and the physical network recommendation model is adjusted based on a detection result.

Based on the method shown in FIG. 1, a user only needs to input the network type of the target network instead of a large quantity of detailed network configurations, so that a network management system can automatically establish the required target network for the user, thereby greatly improving efficiency of establishing the target network. The network type of the target network input by the user may be understood as an intent of the user instead of a configuration solution of the user. Therefore, the method may be understood as implementing automatic establishment of the network required by the user based on the intent of the user. In addition, because the method can optimize recommendation of the network model based on simulation detection and a detection result of performance of the actually deployed network, a running effect of the overall mechanism can be continuously improved, and a matching degree between the recommended network and the user intent can be improved.

Figure 2A:
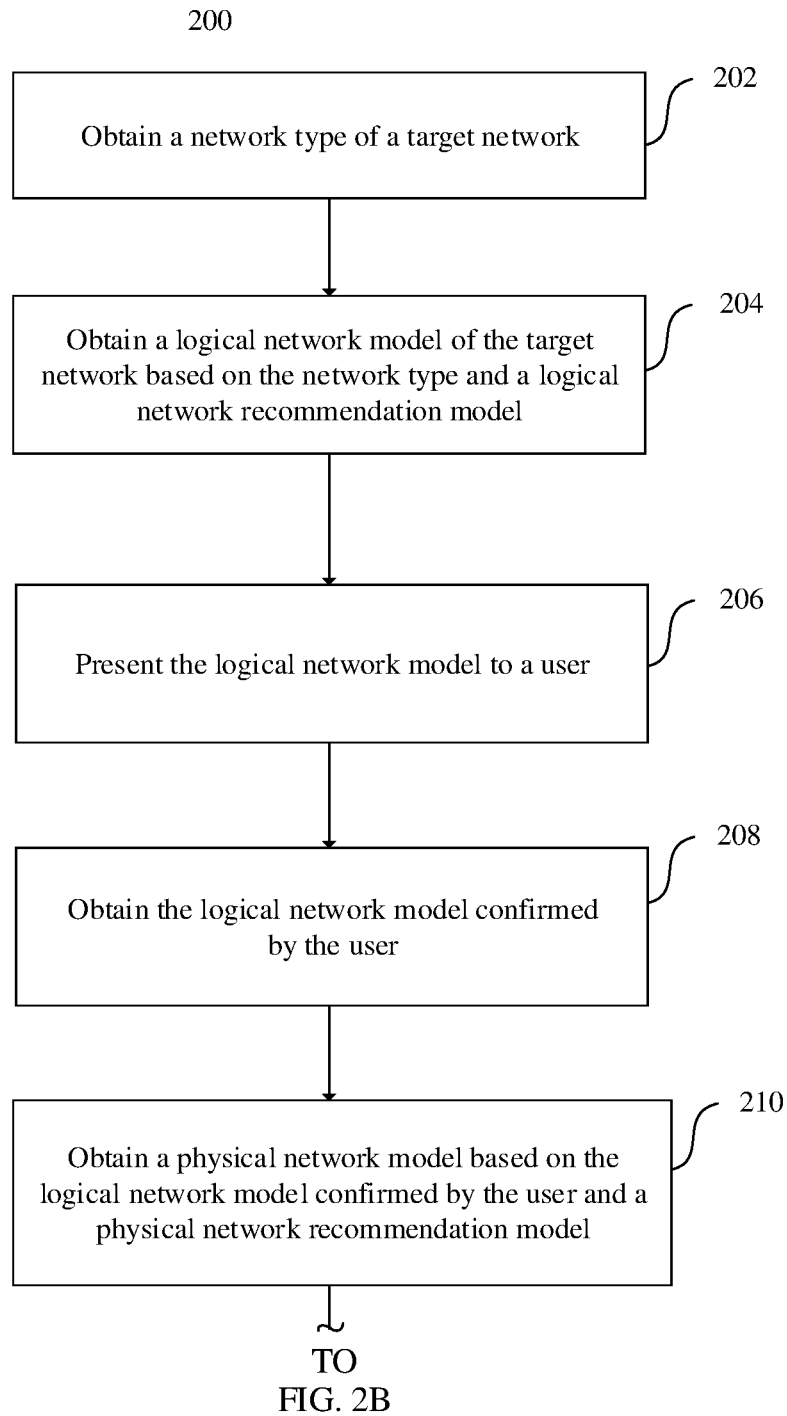
FIG. 2A and FIG. 2B are a flowchart of a network configuration method 200 for generating a target network according to an embodiment.
Figure 2B:
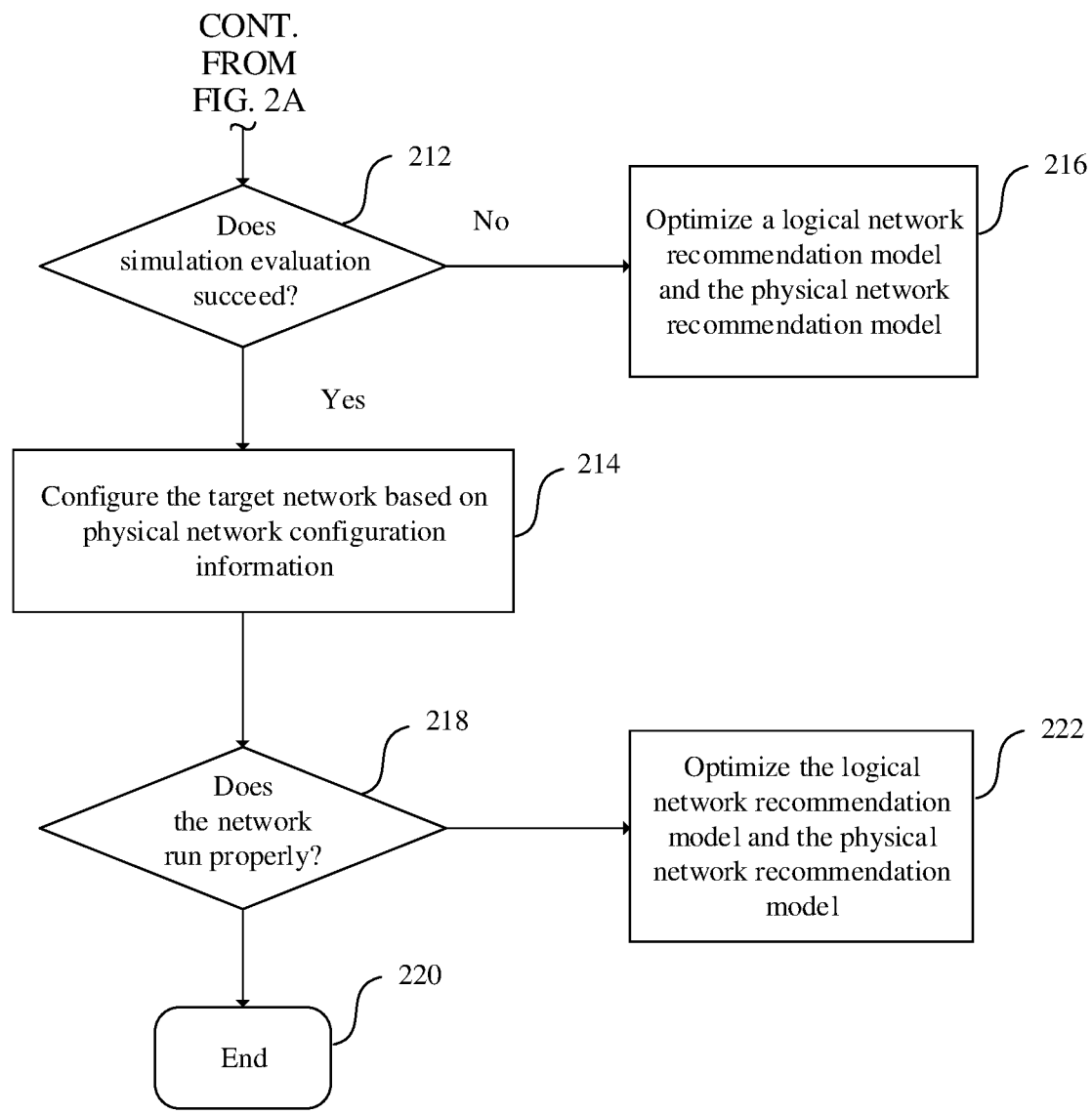

FIG. 2A and FIG. 2B are a flowchart of a network configuration method 200 for generating a target network according to an embodiment. As shown in FIG. 2A and FIG. 2B, the method 200 includes the following content.

202: Obtain a network type of a target network.

The network type of the target network may be input by a network administrator by using a user interface (UI), so that a network management system obtains the network type of the target network. For example, the network type may be an e-banking system, a ticketing system, a video surveillance system, an online trading platform, an office system, or the like. The network administrator may directly spell the network type, select the network type from options displayed on the UI, input code corresponding to the network type, or the like. In some cases, the network administrator may further input some performance requirements for the network type by using the UI, so that the network management system subsequently recommends a logical network model based on the performance requirements. The network management system herein may be an independent hardware device or may be a plurality of hardware devices having a communication relationship.

204: Obtain a logical network model of the target network based on the network type and a logical network recommendation model.

Each network type may correspond to a plurality of services. To implement a network of this network type, a plurality of services corresponding to this network type need to be implemented. The logical network recommendation model may determine the plurality of services corresponding to the network type based on the network type. Common services include a web (web) service, an application (APP) service, and a database (DB) service. In some cases, the web service may be a platform on which a user interacts with the target network. The user may interact with the target network by using a mobile terminal and a personal computer. The APP service is used to provide a background service for the web service. The DB service is used to set a storage location of data in the target network. One network type may correspond to some or all of these services and may further correspond to some other services.

The logical network recommendation model may obtain the logical network model of the target network based on the network type of the target network. The logical network recommendation model may separately generate a logical network model of each service for the plurality of services of the target network, and then generate the logical network model of the target network based on the logical network model of each service. In addition, the logical network recommendation model may alternatively directly generate the logical network model of the target network based on the network type of the target network.

The logical network model may be a VPC. The full name of the VPC is Virtual Private Cloud, and is equivalent to a private local area network for meeting a service requirement, and can define unique security configuration, capacity configuration, computing resource configuration, and the like.

206: Present the logical network model to the user.

After obtaining the logical network model by performing 204, the network management system presents the logical network model to the user, so that the user decides whether to directly accept the logical network model or modify the logical network model.

208: Obtain the logical network model confirmed by the user.

When the user directly accepts the logical network model, the network model is the logical network model confirmed by the user; or when the user modifies the logical network model, the modified logical network model is the logical network model confirmed by the user. In either case, the logical network model confirmed by the user is obtained based on the logical network model obtained by performing 206.

210: Obtain a physical network model based on the logical network model confirmed by the user and a physical network recommendation model.

The physical network recommendation model may generate physical network models corresponding to a plurality of preferences based on the logical network model confirmed by the user, so that the user selects one physical network model for the target network based on a preference of the user and establishes the target network based on the selected physical network model. There may be many preferences herein, for example, performance priority, cost priority, and security priority. Selecting which preferences may be configured by the system by default or may be configured by the network administrator. The network administrator may be understood as the user or as a person who works for the user. The physical network recommendation model may alternatively generate one physical network model. In this case, the user can establish the target network only based on the unique physical network model.

The logical network model includes a topology including a plurality of logical nodes and a performance requirement for the plurality of logical nodes, such as presence or absence of a hardware firewall, a size of egress bandwidth, a parallel processing capability, and/or access right control. The physical network model includes a topology including a plurality of physical nodes and configuration parameters of the plurality of physical nodes. The physical network recommendation model may be implemented by using a supervised and/or unsupervised machine learning algorithm.

212: Determine whether simulation evaluation of the physical network model succeeds. If the simulation evaluation can succeed, an operation 214 is performed. If the simulation evaluation cannot succeed, an operation 216 is performed based on the result that the simulation valuation does not succeed, to optimize the physical network recommendation model and the logical network recommendation model, so that the two models can output better results.

214: Configure the target network based on the physical network model.

After configuration, the target network can be generated. After being generated, the target network can start to run, to implement functions of the target network.

216: Improve the physical network recommendation model and the logical network recommendation model based on the result that the simulation evaluation of the physical network model does not succeed, for example, reduce a probability that the logical network model and the physical network model are recommended for the user requirement or a similar requirement.

218: Track performance of the target network to obtain a statistical result of running of the target network and determine whether the target network runs properly.

After the target network starts to run, the network management system may track a running status of the network to obtain the statistical result.

220: Configuration succeeds when it is determined that the target network runs properly, and this process ends.

222: Improve the physical network recommendation model and the logical network recommendation model based on a result that it is determined that the target network does not run properly, for example, reduce a probability that the logical network model and the physical network model are recommended for the user requirement or a similar requirement.

In some embodiments, the logical network recommendation model may be implemented based on a knowledge graph technology. In the knowledge graph technology, there are a plurality of concepts such as entity, attribute, and relationship. The entity may be a system, a module, a submodule, or the like. The attribute is an indicator of the entity. The relationship is an association between entities. These concepts are now described by way of example.

A system entity may be a network type, and each network type may be understood as a system entity. For example, an e-banking system may be a system entity, and a ticketing system may also be a system entity.

Module entities may be a plurality of services included in one network type. For example, if a network type includes or corresponds to a web service, an APP service, and a DB service, module entities included in a system entity corresponding to the network type include a web module entity, an APP module entity, and a DB module entity.

A submodule entity may be attribute information of a module entity. For example, a web module entity may include an egress entity, a security level entity, an elastic IP (EIP) entity, a capacity entity, an elastic load balancing (ELB) entity, and a service-level agreement (SLA) level entity.

If a submodule entity may further be subdivided, the submodule entity may further include a plurality of secondary submodule entities. Entity division may be continuously performed until the entity cannot be further divided into lower-level submodules.

The attribute may be an indicator of the lowest-level entity that cannot be further divided. For example, when both the capacity entity and the security level entity are entities that cannot be further divided, the attribute of the capacity entity may be 5000 capacity units, and the attribute of the security level entity may be high.

The relationship may be an association between entities. For example, the system entity: the e-banking system includes a web module entity, and the web module entity includes a security level entity.

Generation of a knowledge graph may include two parts: data acquisition and data representation. The acquired data may be information about product performance parameters in a product specification, expert experience, historical successful cases, and the like. The data representation refers to representing data as entities, attributes of entities, and relationships between entities.

Figure 3A:
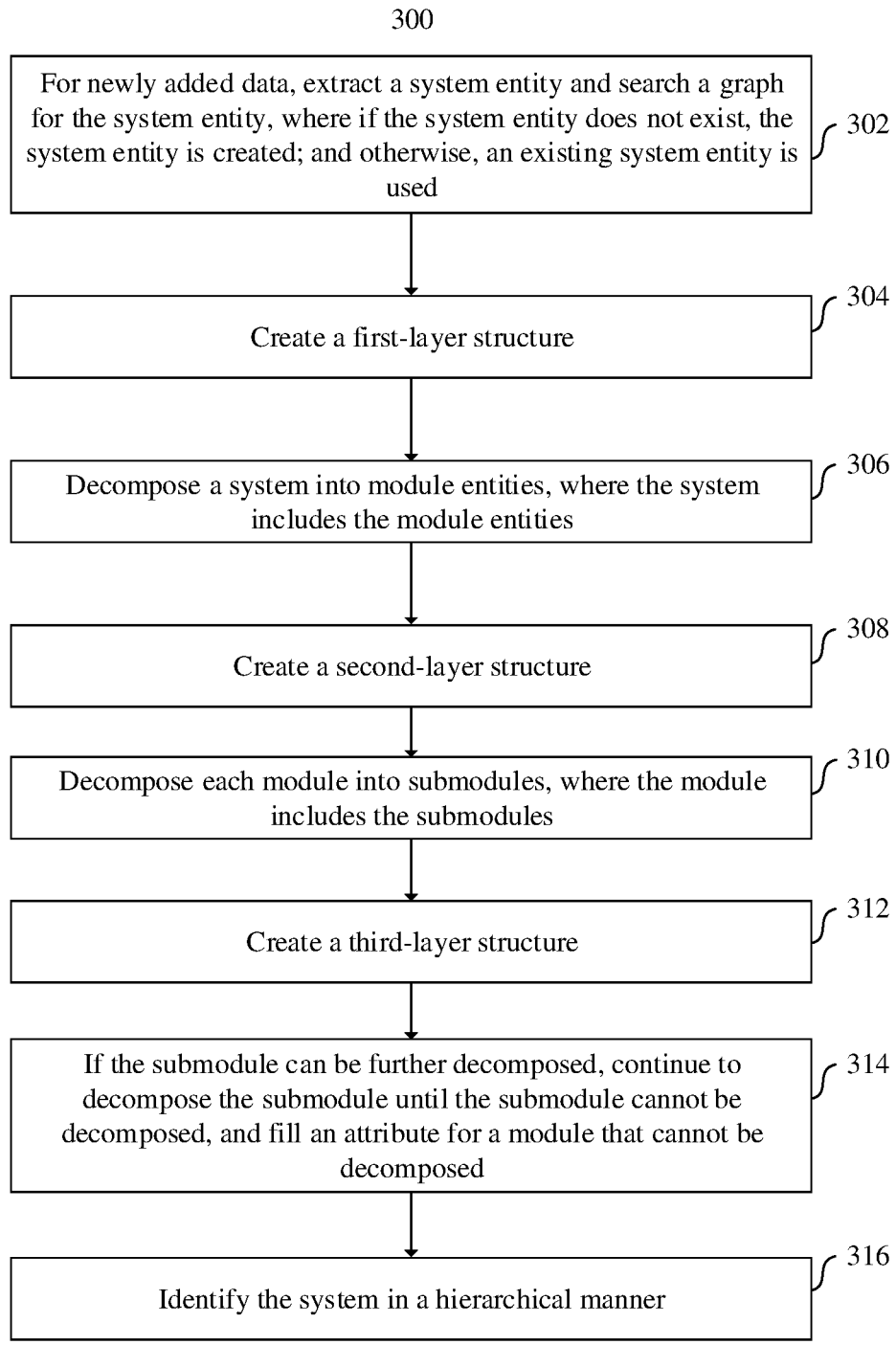
FIG. 3a is a flowchart of a method 300 for generating a knowledge graph according to an embodiment.

FIG. 3a is a flowchart of a method 300 for generating a knowledge graph according to an embodiment.

302: For newly added data, extract a system entity and search a graph for the system entity. If the system entity does not exist, the system entity is created; and otherwise, an existing system entity is used. The following provides description by using an e-banking system as an example.

304: Create a first-layer structure.

{e-banking system:}

306: Decompose a system into module entities, where the system includes the module entities. The graph is searched for each module entity. If the module entity does not exist, the module entity is created; and otherwise, an existing module entity is used.

308: Create a second-layer structure.

---
{e-banking system:
   {web:},
   {APP:},
   {DB:}
}
---

310: Decompose each module into submodules, where the module includes the submodules. The graph is searched for each submodule entity. If the submodule entity does not exist, the submodule entity is created; and otherwise, an existing submodule entity is used.

312: Create a third-layer structure.

---
{e-banking system:
   {web:
     {Exit:},
     {Safety level:},
     {Capacity:},
     ...
   },
   {APP:
     {Exit:},
     {Safety level:},
     {Capacity:},
     ...
   },
   {DB:
     {Exit:},
     {Safety level:},
     {Capacity:},
     ...
   }
}
---

314: If the submodule can be further decomposed, continue to decompose the submodule until the submodule cannot be decomposed, and fill an attribute for a module that cannot be decomposed. If the attribute already exits, the attribute is directly used, and otherwise, a new attribute value is filled. A basic module is represented as {basic module entity-attribute-attribute value}. These modules that cannot be further decomposed are basic modules that construct this system.

```
{e-banking system:
    {web:
        {exit-exit location-extranet},
        {security level-level value-DMZ},
        {capacity-VM quantity-80},
        ...
    },
    {APP:
        {exit-exit location-extranet},
        {security level-level value-T},
        {capacity-VM quantity-100},
        ...
    },
    {DB:
        {exit-exit location-production intranet},
        {security level-level value-M},
        {capacity-physical machine quantity-150},
        ...
    }
}
```

So far, input of a historical successful case or expert experience is basically implemented. With an increase of input data, a quantity of non-decomposable basic modules increases and values of the modules become increasingly diversified. These basic modules construct functional modules, and the functional modules construct systems, and complete representation of each system.

Figure 3B:
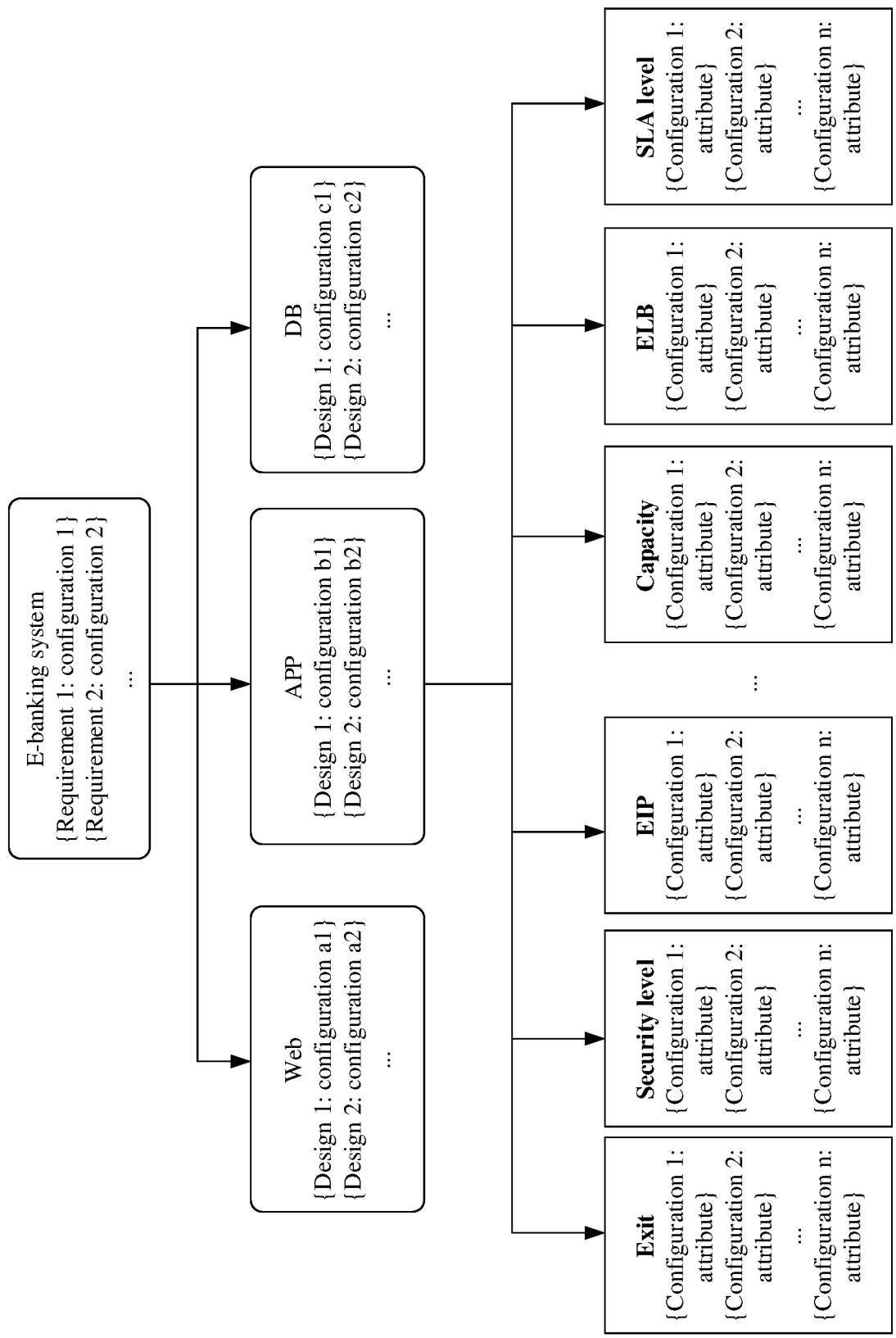
FIG. 3b is a simplified tree diagram of a knowledge graph according to an embodiment.

FIG. 3b is a simplified tree diagram of a knowledge graph according to an embodiment. To save space, FIG. 3b shows only an example of a third-layer structure corresponding to an APP module entity. FIG. 3b shows that a first-layer structure includes an e-banking system entity, a second-layer structure includes three entities: web, APP, and DB, and the third-layer structure uses the APP module entity as an example and shows a plurality of lower-level entities that may be included in the APP module entity. It can be learned from FIG. 3b that, there may be a plurality of configurations for each entity.

318: Store a record into a graph database, where entities are represented as nodes and relationships between entities are represented as edges.

320: Represent each record as one vector, where elements of the vector are all basic modules in the system, and a value of the vector is a normalized value or a one-hot encoded value. Assuming that the web module entity includes six entities with the third-layer structure, the APP module entity includes seven entities with the third-layer structure, and the DB module entity includes eight entities with the third-layer structure, the e-banking system may be represented as a 21-dimensional vector.

Figure 3C:
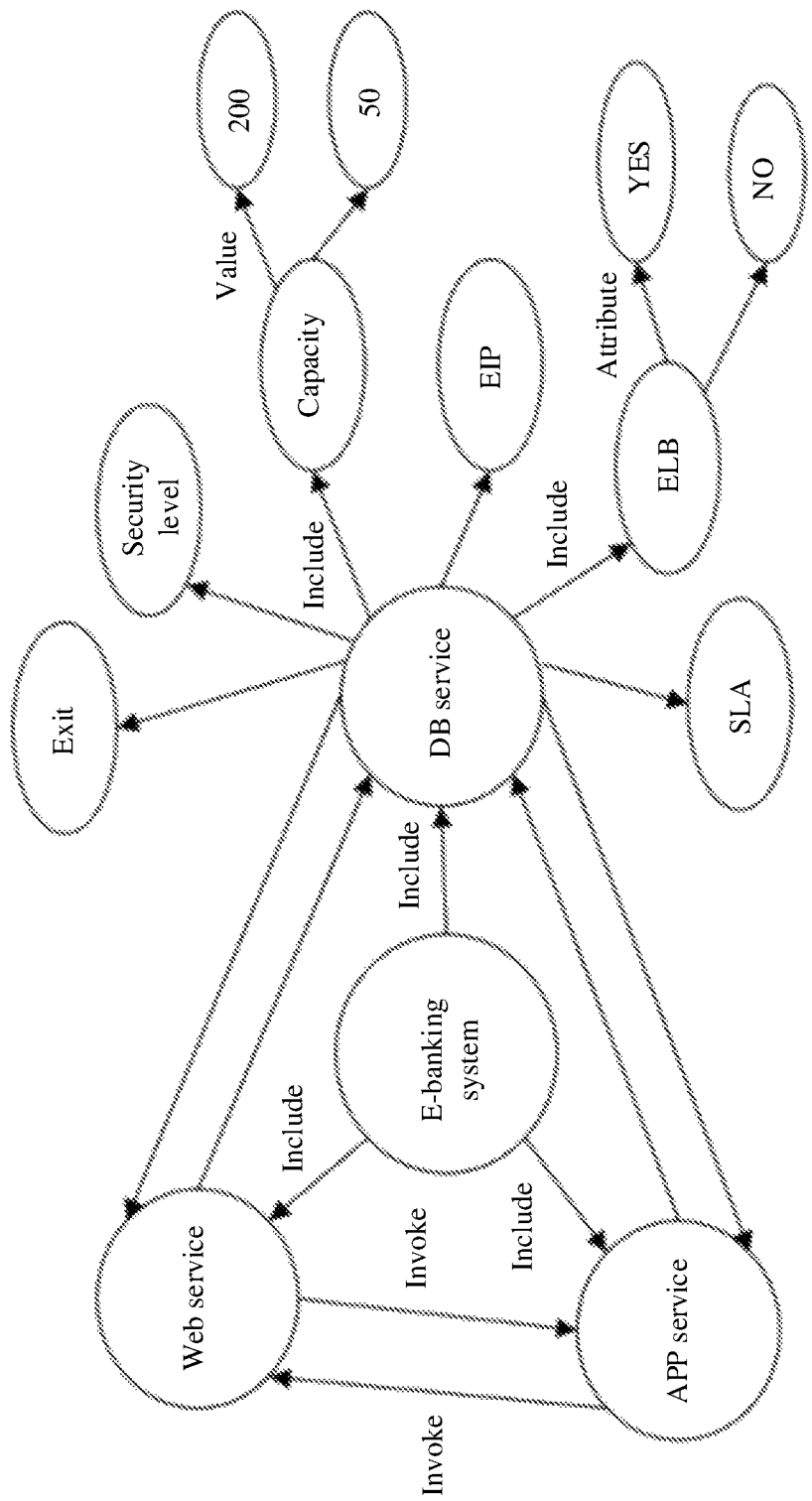
FIG. 3c is a topology diagram of a knowledge graph according to an embodiment.

FIG. 3c is a topology diagram of a knowledge graph according to an embodiment. In FIG. 3c, a line segment with an arrow is used to indicate that entities at both ends of the line segment have a relationship, and a party pointed to by the arrow is a passive party in the relationship. For example, a line segment between the e-banking system and the APP service has an arrow pointing to the APP service, and "include" is marked near the line segment. This indicates that the e-banking system entity includes the APP service entity, and the APP service entity is an included entity. Similarly, a line segment pointing to the web service entity exists between the APP service entity and the web service entity, and "invoke" is marked near the line segment. This indicates that the APP service entity needs to invoke the web service entity, and the web service entity is an invoked entity. In FIG. 3c, values of a capacity entity that belongs to the DB service entity may be 200 and 50. The values herein are merely an example. In practice, each bottom-layer entity may have a plurality of values, and each value may correspond to one configuration in configuration 1 to configuration n in FIG. 3b.

Figure 4:
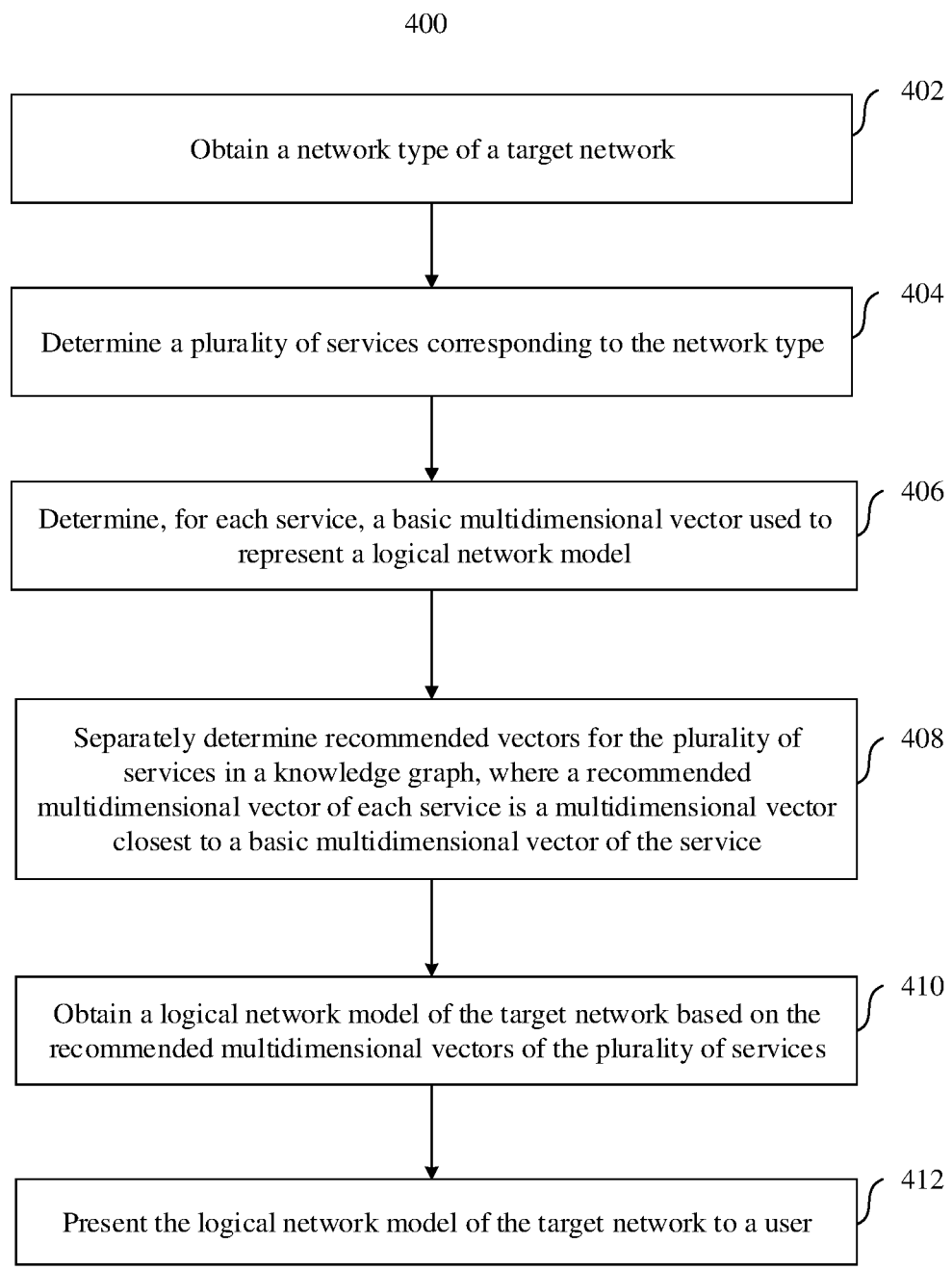
FIG. 4 is a flowchart of a method 400 for recommending a logical network model by using a logical network recommendation model according to an embodiment.

FIG. 4 is a flowchart of a method 400 for recommending a logical network model by using a logical network recommendation model according to an embodiment.

402: Obtain a network type of a target network.

Specific content of the operation 402 may be the same as that of the operation 202. The network type of the target network obtained by a network management system may be understood as a result of intent input by a network administrator. In addition to inputting the network type, the network administrator may also input some special requirements for the target network, such as a specific requirement for security and a specific requirement for a network forwarding capability.

404: Determine a plurality of services corresponding to the network type.

The network management system may determine, based on the obtained network type, a plurality of services used to implement the target network. In an example, when the network type of the target network is an e-banking system, the plurality of corresponding services includes a web service, an APP service, and a DB service. The e-banking system may further include another service or may lack one or more of the foregoing three services. 404 may be implemented based on a preset correspondence between the network type and the plurality of services.

406: Determine, for each service, a basic multidimensional vector used to represent a logical network model.

The multidimensional vector is now described by way of example. A multidimensional vector corresponding to a service can represent, in a vector manner, a logical network model used to implement the service. For example, a basic multidimensional vector of the web service can represent, in the vector manner, a logical network model used to implement the web service. Each dimension of a multidimensional vector may include some information, and a logical network model can be reflected by integrating the information together. A basic multidimensional vector is essentially a multidimensional vector.

The logical network recommendation model may store a set including correspondences between a plurality of services and basic multidimensional vectors. After it is determined that a network type includes a web service and an APP service, the logical network recommendation model may separately find, in the set, a basic multidimensional vector of the web service and a basic multidimensional vector of the APP service.

If the network administrator inputs some special requirements for the target network in 402, after the basic multidimensional vectors of the plurality of services are found, the basic multidimensional vectors corresponding to the related services further need to be modified based on the special requirements. In this case, the modified basic multidimensional vectors are the basic multidimensional vectors used to represent the logical network model in 406.

408: Separately determine recommended vectors for the plurality of services in a knowledge graph, where a recommended multidimensional vector of each service is a multidimensional vector closest to the basic multidimensional vector of the service.

For example, a multidimensional vector closest to the basic multidimensional vector of the web service may be found in the knowledge graph, and the multidimensional vector may be considered as a multidimensional vector of the web service. A multidimensional vector closest to the basic multidimensional vector of the APP service may be found in the knowledge graph, and the multidimensional vector may be considered as a multidimensional vector of the APP service.

In the knowledge graph shown in FIG. 3b, each service is actually a multidimensional vector, but the multidimensional vector has a plurality of values. The APP service in FIG. 3b may actually be some multidimensional vectors, a quantity of dimensions is the same as a quantity of third-layer entities, and a quantity of values of the multidimensional vector is related to a quantity of configured attribute values of the third-layer entity. For example, it may be considered that the multidimensional vector of the APP service has n values. In this embodiment, a value closest to a value of a basic multidimensional vector of a service needs to be found from a plurality of values of a multidimensional vector of the service.

410: Obtain the logical network model of the target network based on the recommended multidimensional vectors of the plurality of services.

The logical network recommendation model may first generate a unified multidimensional vector based on the recommended multidimensional vectors of the plurality of services, and then represent the unified multidimensional vector as the logical network model. Inside the unified multidimensional vector, the recommended multidimensional vectors of the plurality of services may remain logically independent.

412: Present the logical network model of the target network to a user.

Figure 5:
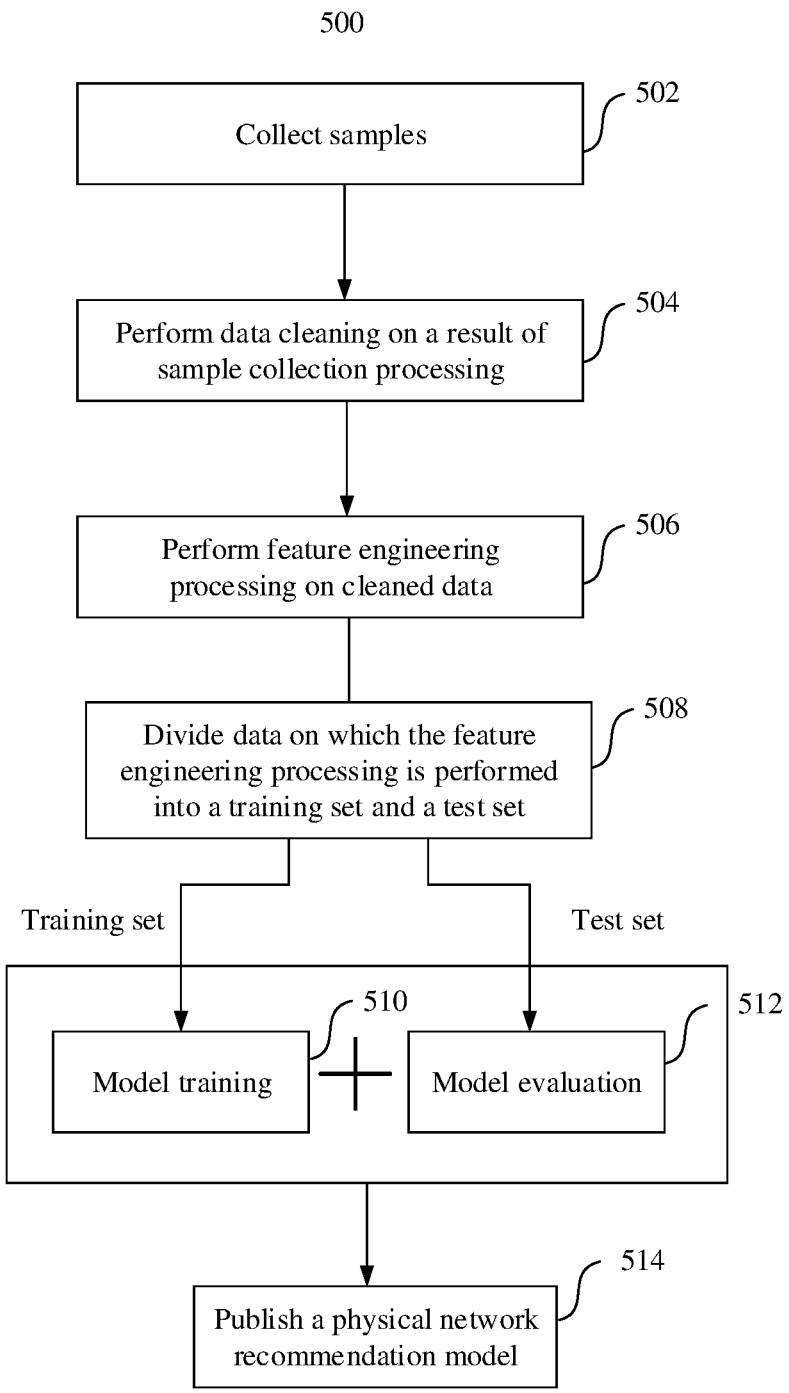
FIG. 5 is a flowchart of a method 500 for constructing a physical network recommendation model according to an embodiment.

FIG. 5 is a flowchart of a method 500 for constructing a physical network recommendation model according to an embodiment. A logical network model of a target network is input into the physical network recommendation model, so that a physical network model used to implement the target network required by a user can be obtained. As shown in FIG. 5, the method 500 for constructing the physical network recommendation model includes the following content.

502: Collect samples.

A network management system collects a plurality of network requirements, configuration solutions respectively corresponding to the plurality of network requirements, and application results of the configuration solutions. The network management system needs to generate the physical network recommendation model based on these.

As shown in Table 1, collected sample information includes three types of information: network requirements, network solutions, and application results. A network requirement is a digital representation of a logical network model of a network, and each network requirement actually indicates a logical network model of a network. The network requirement may express a logical network model of a network in a matrix manner. For a simple logical network model, the network requirement may be a matrix, and for a complex logical network model, the network requirement may include a plurality of matrices. The configuration solution may be a physical network model of a network requirement corresponding to the configuration solution. The application result may indicate whether a physical network model corresponding to the network requirement successfully runs in an actual network.

TABLE 1

| Labeled samples | | |
|---|---|---|
| Network requirement | Network solution | Application result |
| Requirement 1 | Configuration 1 | Success |
| Requirement 2 | Configuration 2 | Failure |
| Requirement 3 | Configuration 3 | Failure |
| ... | ... | |
| Requirement n | Configuration n | Success |

504: Perform data cleaning on a result of sample collection processing.

After collecting the samples, the network management system may perform data cleaning on the collected samples, to eliminate negative impact of abnormal values and missing values on establishment of the network recommendation model.

There may be values that are definitely abnormal in the collected samples. For example, a port in the samples has a bandwidth of several Mbits per second. Such an abnormal value may be set to be invalid or reset to an average value of bandwidths of a plurality of ports.

506: Perform feature engineering processing on cleaned data.

After the data is cleaned, the network management system may perform normalization, binning, and encoding on the cleaned data. The following describes normalization, binning, and encoding by way of example.

Example of Normalization

When a range of bandwidths of ports is 1 M to 100 M, normalization may be performed on the bandwidth range to simplify operation of a computer system. In a specific processing manner, the bandwidths of the ports may be divided by 100 M, so that the range of the bandwidths of the ports is 0.01 to 1.

Example of Binning

For example, the ports are binned based on remaining bandwidths of the ports. Ports whose remaining bandwidths are less than 10 M may be grouped into a first group, ports whose remaining bandwidths are greater than 10 M and less than 50 M may be grouped into a second group, and ports whose remaining bandwidths are greater than 50 M may be grouped into a third group.

Example of Encoding

Information that cannot be directly recognized by a computer is converted into information that can be recognized by the computer. For example, "yes" is represented as "1" and "no" is represented as "0".

508: Divide data on which the feature engineering processing is performed into a training set and a test set.

A ratio of a data volume of the training set to a data volume of the test set may be 7:3, 8:2, 6:4, or another ratio relationship. A sum of data in the training set and the test set may be less than all the data on which the feature engineering processing is performed. In addition, in some embodiments, the data obtained through sample collection may be divided into the test set and the training set when the data cleaning and/or the feature engineering processing are/is not performed.

510: Perform model training based on data of the training set, to obtain a plurality of preliminary network recommendation models.

A supervised and/or unsupervised machine learning algorithm may be used. For example, the supervised algorithm may be a logistic regression algorithm, a random forest algorithm, or the like, and the unsupervised algorithm may be a K-MEANS algorithm, an expectation maximization (EM) algorithm, or the like.

512: Evaluate the plurality of preliminary network recommendation models separately based on data of the test set.

514: Select, based on evaluation results of the plurality of preliminary network recommendation models, one or more preliminary network recommendation models as one network recommendation model for publication. When the published network recommendation model includes the plurality of preliminary physical network recommendation models, the plurality of preliminary physical network recommendation models may be in one-to-one correspondence with a plurality of preferences. Each preliminary physical network recommendation model may be understood as one function.

After the physical network recommendation model is published, the network management system may obtain a physical network model of the target network based on the logical network model of the target network and the physical network recommendation model. For example, the network management system may input a digital representation of the logical network model of the target network, for example, one or more matrices, into the corresponding physical network recommendation model, to obtain the physical network model of the target network.

When the corresponding physical network recommendation model has only one preliminary physical network recommendation model, the user may directly obtain a unique physical network model, or it may be understood that the user selects the unique physical network model. When the corresponding physical network recommendation model includes a plurality of preliminary physical network recommendation models, and each preliminary physical network recommendation model corresponds to one preference, a plurality of physical network models may be separately obtained, where each physical network model corresponds to one preference. The user may select a physical network model based on a preference of the user.

After the user selects the physical network model, the network management system performs simulation evaluation on the selected physical network model. If the simulation evaluation on the selected physical network model succeeds, the network management system configures a network based on the selected physical network model, to establish the target network.

If the simulation evaluation on the selected physical network model does not succeed, the physical network recommendation model outputs another different physical network model. In addition, the network management system may further send a result that the simulation evaluation does not succeed to a module responsible for sample collection. In this way, data in Table 1 is further expanded, so that a better physical network recommendation model is obtained when the physical network recommendation model is further trained subsequently. "Network requirement" in Table 1 may be determined based on the logical network model of the target network, "network solution" may be determined based on the physical network model of the target network, and "application result" may be filled as a failure.

After the target network is established, the network management system may further check a running status of the target network to determine whether the target network is a successful network or a failed network. The network management system may feed back a check result to the module responsible for sample collection. In this way, the data in Table 1 is further expanded, to obtain a better physical network recommendation model when the physical network recommendation model is further trained subsequently.

In this embodiment, A and/or B may represent not only A and B, but also A or B.

Figure 6:
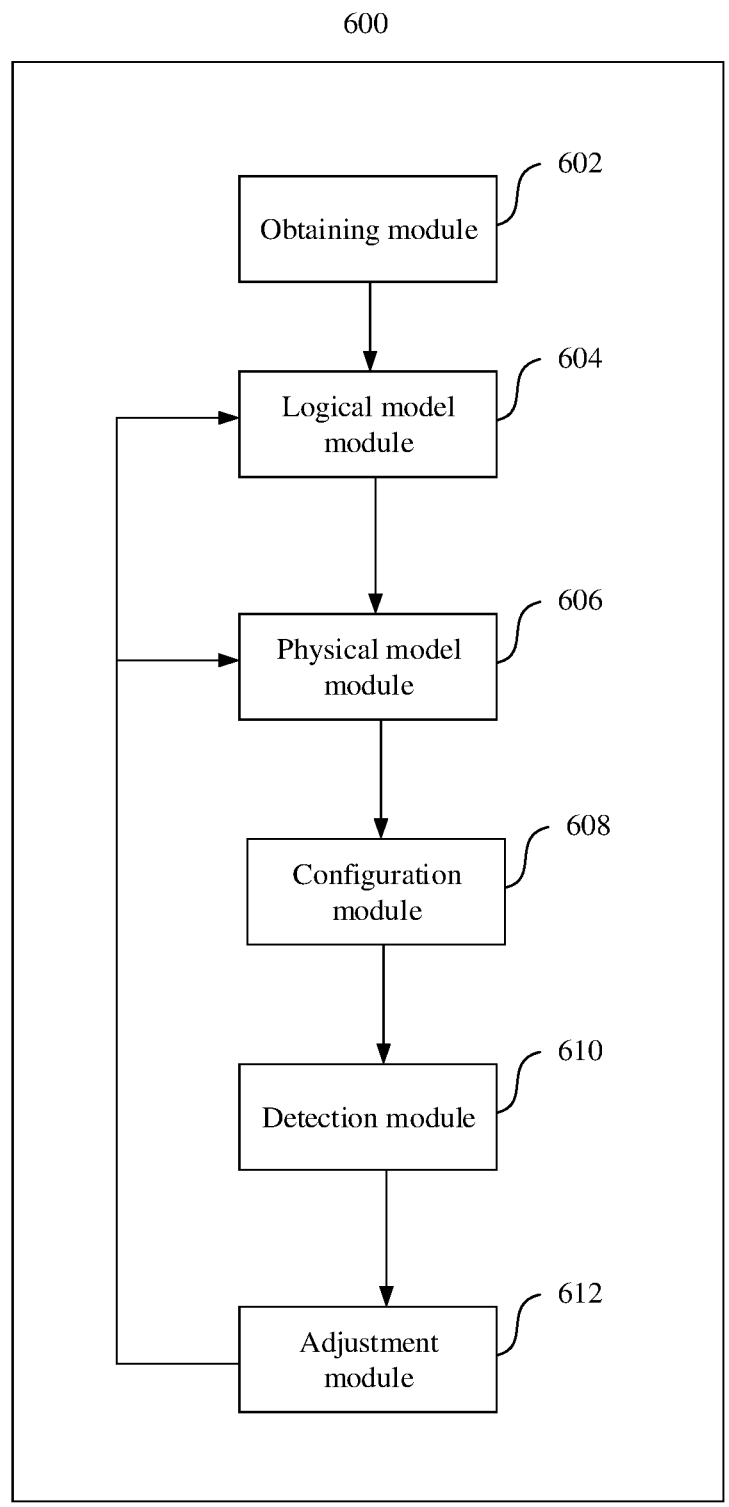
FIG. 6 is a schematic diagram of a network management system 600 according to an embodiment.

FIG. 6 is a schematic diagram of a network management system 600 according to an embodiment. As shown in FIG. 6, the network management system 600 includes an obtaining module 602, a logical model module 604, a physical model module 606, and a configuration module 608.

The obtaining module 602 is configured to obtain a network type of a target network.

The logical model module 604 is configured to obtain a logical network model of the target network based on the network type and a logical network recommendation model. The logical network recommendation model is a recommendation model based on a knowledge graph. The knowledge graph includes m entities, the m entities are located at n layers, entities located at a lowest layer are indivisible entities and are provided with a plurality of attribute values, m and n are natural numbers, and m is greater than n.

The physical model module 606 is configured to determine a physical network model of the target network based on the logical network model and a physical network recommendation model. In some embodiments, the physical model module 606 is configured to: determine a plurality of physical network models based on the logical network model and the physical network recommendation model, where the physical network recommendation model includes a plurality of preliminary physical network recommendation models, and each physical network model corresponds to one preference; and select one from the plurality of physical network models based on a selection of a user as the physical network model of the target network. In some other embodiments, the physical model module 606 directly determines a physical network model irrelevant with a preference for a user.

The configuration module 608 is configured to perform network configuration based on the physical network model of the target network, to establish the target network required by the user. In some embodiments, the configuration module 608 may perform a simulation test process before performing the network configuration. The simulation test process includes performing a simulation test on the physical network model of the target network. The configuration module 608 performs the network configuration based on the physical network model after determining that the simulation test of the physical network model succeeds. The configuration module 608 does not perform the network configuration based on the physical network model if the simulation test of the physical network model does not succeed. The physical network recommendation model regenerates a new physical network model. The configuration module 608 performs the network configuration based on the new physical network model if the simulation test of the new physical network model succeeds. In some embodiments, the configuration module 608 may perform the network configuration based on the physical network model of the target network when the simulation test is not performed.

In addition, the network management system 600 may further include a detection module 610 and an adjustment module 612. The detection module 610 is configured to detect running of the target network obtained based on the network configuration; and the adjustment module 612 is configured to adjust the physical network recommendation model based on a detection result. The network management system 600 may alternatively not detect running of the target network.

The network management system 600 may be an independent physical device or may be a plurality of physical devices having a communication relationship. When the network management system 600 is a plurality of physical devices having a communication relationship, the plurality of modules shown in FIG. 6 may be deployed in different physical devices.

The network management system 600 may be a network management system that performs the methods shown in FIG. 1 to FIG. 5. The network management system 600 implements the methods shown in FIG. 1 to FIG. 5 based on the plurality of modules inside the network management system 600. For example, the obtaining module 602 may be configured to implement an operation related to obtaining the network type of the target network in the methods shown in FIG. 1 to FIG. 5, the logical model module 604 may be configured to implement an operation related to recommending or determining the logical network model in the methods shown in FIG. 1 to FIG. 5, the physical model module 606 may be configured to implement an operation related to recommending or determining the physical network model in the methods shown in FIG. 1 to FIG. 5, and the configuration module 608 may be configured to implement an operation related to performing the network configuration based on the physical network model in the methods shown in FIG. 1 to FIG. 5. In addition, the detection module 610 may be configured to implement an operation of detecting running of the target network in the methods shown in FIG. 1 to FIG. 5, and the adjustment module 612 may be configured to implement an operation of adjusting the physical network recommendation model based on the detection result in the methods shown in FIG. 1 to FIG. 5.

Figure 7:
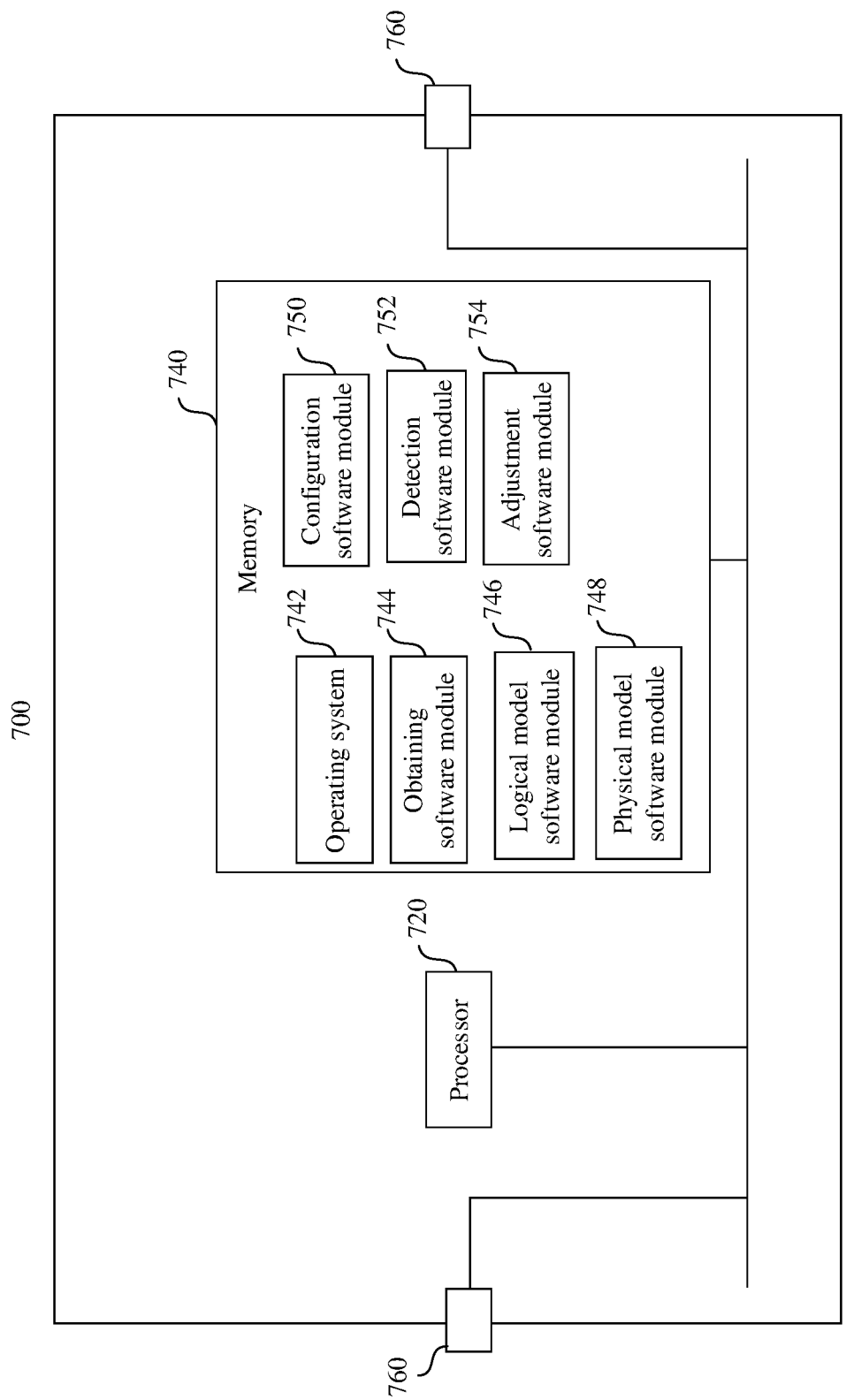
FIG. 7 is a schematic diagram of a network management system 700 according to an embodiment.

FIG. 7 is a schematic diagram of a network management system 700 according to an embodiment. As shown in FIG. 7, the network management system 700 includes a processor 720, a memory 740, and a transceiver 760.

The processor 720 may be one or more central processing units (CPU), one or more network processors (NP), or a combination of a CPU and an NP. The processor 720 may alternatively be one or more application-specific integrated circuits (ASICs), one or more programmable logic devices (PLDs), or a combination thereof. The PLD may be a complex programmable logic device (CPLD), a field-programmable gate array (FPGA), generic array logic (GAL), or any combination thereof. The memory 740 may be one memory or may include a plurality of memories. The memory 740 may include a volatile memory, for example, a random access memory (RAM); the memory 740 may alternatively include a non-volatile memory, for example, a read-only memory (ROM), a flash memory, a hard disk drive (HDD), or a solid-state drive (SSD); and the memory 740 may alternatively include a combination of the foregoing types of memories. The memory 740 stores computer-readable instructions, and the computer-readable instructions include a plurality of software modules. After executing each software module, the processor 720 may perform a corresponding operation based on an indication of each software module. After executing the computer readable instruction in the memory 740, the processor 720 may perform, according to an indication of the computer readable instruction, the methods shown in FIG. 1 to FIG. 5. The transceiver 760 may be an Ethernet interface or may be a network interface of another type.

The memory 740 includes a plurality of software modules 742 to 754 that can be executed by the processor 720. After executed by the processor 720, the operating system 742 is referred to as a platform on which the processor executes other software modules, such as software modules 744 to 754. The processor 720 may perform, by executing code in an obtaining software module 744, an operation related to obtaining the network type of the target network in the methods shown in FIG. 1 to FIG. 5; the processor 720 may perform, by executing code in a logical model software module 746, an operation related to recommending or determining the logical network model in the methods shown in FIG. 1 to FIG. 5; the processor 720 may perform, by executing code in a physical model software module 748, an operation related to recommending or determining the physical network model in the methods shown in FIG. 1 to FIG. 5; and the processor 720 may perform, by executing code in a configuration software module 750, an operation related to performing the network configuration based on the physical network model in the methods shown in FIG. 1 to FIG. 5. In addition, the processor 720 may perform, by executing code in a detection software module 752, an operation of detecting running of the target network in the methods shown in FIG. 1 to FIG. 5; and the processor 720 may execute, by executing code in an adjustment software module 754, an operation of adjusting the physical network recommendation model based on the detection result in the methods shown in FIG. 1 to FIG. 5. In some embodiments, the software modules 744 to 754 may be stored in different memories.

The foregoing descriptions are merely preferred embodiments, but are not intended to limit the scope of the embodiments. Any variation or replacement readily figured out by a person skilled in the art shall fall within the scope of the embodiments.

What is claimed is:

1. A network management method comprising:
obtaining a network type of a target network;
generating, by executing a logical network recommendation model and based on the network type, a logical network model of the target network, wherein the logical network recommendation model is based on a knowledge graph for network analyses;
generating, by executing a physical network recommendation model and based on the logical network model, a physical network model of the target network; and
performing network configuration based on the physical network model of the target network;
determining whether to improve the physical network recommendation model and the logical network recommendation model based on a running status of the target network configured based on the physical network; and
reducing a probability that the logical network recommendation network model and the physical network recommendation model are recommended when a running status of the target network configured based on the physical network is poor.

2. The network management method according to claim 1, wherein the physical network recommendation model is a machining learning program.

3. The network management method according to claim 1, wherein the knowledge graph comprises m entities, the m entities are located at n layers, entities located at a lowest layer are indivisible entities and are provided with a plurality of attribute values, m and n are natural numbers, and m is greater than n.

4. The network management method according to claim 1, wherein the step of generating, by executing the physical network recommendation model, the physical network model of the target network comprises:
   determining a plurality of physical network models based on the logical network model and the physical network recommendation model, wherein the physical network recommendation model comprises a plurality of preliminary physical network recommendation models, and each physical network model corresponds to one preference; and
   selecting one from the plurality of physical network models based on a selection of a user as the physical network model of the target network.

5. The network management method according to claim 1, wherein the step of performing the network configuration based on the physical network model of the target network comprises:
   performing a simulation test on the physical network model of the target network; and
   performing the network configuration based on the physical network model after determining that the simulation test of the physical network model succeeds.

6. The network management method according to claim 1, further comprising:
   detecting running of the target network obtained based on the network configuration; and
   adjusting the physical network recommendation model based on a detection result.

7. The network management method according to claim 1, wherein the logical network model comprises a plurality of logical nodes and a performance requirement for the plurality of logical nodes, and the physical network model comprises a plurality of physical nodes and configuration parameters of the plurality of physical nodes.

8. The network management method according to claim 1, wherein the logical network model comprises a virtual private cloud (VPC).

9. A network management system comprising:
   a memory storing executable instructions; and
   a processor configured to execute the executable instructions to:
   obtain a network type of a target network;
   generate, by executing a logical network recommendation model and based on the network type, a logical network model of the target network wherein the logical network recommendation model is based on a knowledge graph for network analyses;
   generate, by executing a physical network recommendation model and based on the logical network model, a physical network model of the target network;
   perform network configuration based on the physical network model of the target network;
   determine whether to improve the physical network recommendation model and the logical network recommendation model based on a running status of the target network configured based on the physical network; and
   reduce a probability that the logical network recommendation network model and the physical network recommendation model are recommended when a running status of the target network configured based on the physical network is poor.

10. The network management system according to claim 9, wherein the physical network recommendation model is a machine learning program.

11. The network management system according to claim 9, wherein the knowledge graph comprises m entities, the m entities are located at n layers, entities located at a lowest layer are indivisible entities and are provided with a plurality of attribute values, m and n are natural numbers, and m is greater than n.

12. The network management system according to claim 9, wherein the processor is configured to generate, by executing the physical network recommendation model, the physical network model of the target network by performing operations of:
   determining a plurality of physical network models based on the logical network model and the physical network recommendation model, wherein the physical network recommendation model comprises a plurality of preliminary physical network recommendation models, and each physical network model corresponds to one preference; and
   selecting one from the plurality of physical network models based on a selection of a user as the physical network model of the target network.

13. The network management system according to claim 9, wherein the processor is configured to perform the network configuration based on the physical network model of the target network by performing operations of:
   performing a simulation test on the physical network model of the target network; and
   performing the network configuration based on the physical network model after determining that the simulation test of the physical network model succeeds.

14. The network management system according to claim 9, wherein the processor is configured to further execute the executable instructions to:
   detect running of the target network obtained based on the network configuration; and
   adjust the physical network recommendation model based on a detection result.

15. The network management system according to claim 9, wherein the logical network model comprises a plurality of logical nodes and a performance requirement for the plurality of logical nodes, and the physical network model comprises a plurality of physical nodes and configuration parameters of the plurality of physical nodes.

16. The network management system according to claim 9, wherein the logical network model comprises a virtual private cloud (VPC).

17. A non-transitory computer-readable medium storing executable instructions that, when executed by a processor of a network management system, cause the network management system to:
   obtain a network type of a target network;
   generate, by executing a logical network recommendation model and based on the network type, a logical network model of the target network wherein the logical network recommendation model is based on a knowledge graph for network analyses;
   generate, by executing a physical network recommendation model and based on the logical network model, a physical network model of the target network; perform network configuration based on the physical network model of the target network;
   determine whether to improve the physical network recommendation model and the logical network recommendation model based on a running status of the target network configured based on the physical network; and reduce a probability that the logical network recommendation network model and the physical network recommendation model are recommended when a running status of the target network configured based on the physical network is poor.

18. The non-transitory computer-readable medium according to claim 17, wherein physical network recommendation model is a machine learning program.

* * * * *